United States Patent [19]

Süssmuth

[11] 4,115,024
[45] Sep. 19, 1978

[54] SPADE DRILL BLADE

[75] Inventor: Reiner W. Süssmuth, Neu Isenburg, Germany

[73] Assignee: Amtel, Inc., Providence, R.I.

[21] Appl. No.: 774,511

[22] Filed: Mar. 4, 1977

[30] Foreign Application Priority Data

Mar. 4, 1976 [DE] Fed. Rep. of Germany ....... 2608808

[51] Int. Cl.² ............................................. B26D 1/00
[52] U.S. Cl. .................................... 407/114; 407/54; 408/188; 408/233
[58] Field of Search ........................... 29/95 R, 103 R; 408/188, 199, 223, 224, 227, 228, 233, 144, 713; 407/113, 114, 54

[56] References Cited

U.S. PATENT DOCUMENTS

| 3,460,409 | 8/1969 | Stokey | 408/199 |
| 3,776,656 | 12/1973 | Benjamin | 408/233 |
| 3,935,624 | 2/1976 | Weinreich | 408/188 |

FOREIGN PATENT DOCUMENTS 2,422,452  11/1975  Fed. Rep. of Germany ........... 408/227

Primary Examiner—Robert Louis Spruill

[57] ABSTRACT

The present invention relates generally to a spade drill blade and more particularly to a spade drill blade which is adapted to be clamped in the clamp slit of a holder and which has side surfaces that bear against the wall of the bore to be of a raised shape in such a way that during drilling it bears in extremely narrow lateral surface region in a diagonal plane against the inner surface of the bore, and the improvement, therefore, relates to the configuration of the blade with a very narrow contact area between the lateral surfaces of the cutting blade and the wall of the workpiece bore which reduces high surface friction and the risk of jamming or seizure and premature wear which prevents indexing to present the second cutting edge of the blade in the workpiece bore. The raised portion may be shaped in cross section, for example, as a ridge, trapezium, beading, lips or of other forms.

5 Claims, 8 Drawing Figures

SPADE DRILL BLADE

BACKGROUND OF THE INVENTION

In general it is well known to provide spade drills in which a blade is clamped in a holder. Examples of this are shown, for example, in U.S. Pat. No. 3,076,357 and British Pat. No. 1,270,068. The blades that are used in this type of holder are generally provided with lateral edges that are cylindrically ground to provide a guide surface which engages the side of the hole being drilled and to prevent entire engagement these edges are sometimes relieved a certain amount as shown in U.S. Pat. No. 3,076,357. This, however, does not take care of all of the camming and heeling actions.

SUMMARY OF THE INVENTION

The present invention is directed to the basic concept that the lateral edges of a spade cutting blade be of a particular raised shape so that during drilling they bear against the bore of the hole being drilled in extremely narrow surface region. Further this narrow surface region should lie in a diagonal plane which extends approximately through the ends of the drilling edges. This reduces surface friction and thus reduces the risk of binding or jamming of the blade within the workpiece bore and premature wear which prevents indexing to present the second cutting edge of the blade in the workpiece bore. The lateral surfaces of the spade cutting blade may be of a number of shapes; for example, they can consist of a blade having a cylindrical curvature the radius of the curvature being less than the radius of the bit and the axis of the curvature must lie on a line parallel to the line joining the drilling edge ends of the bit. They may also be formed as a line contact with chamfered surfaces and a variety of other ways and in this fashion surface friction, a risk of jamming, binding, or seizing of the cutting blade in the workpiece is practically avoided, nevertheless the cutting blade is supported against the wall of the hole being drilled on a diagonal line to insure reliable guiding of the spade cutting blade in the hole.

DESCRIPTION OF THE PREFERRED EMBODIMENT

Figure 2:
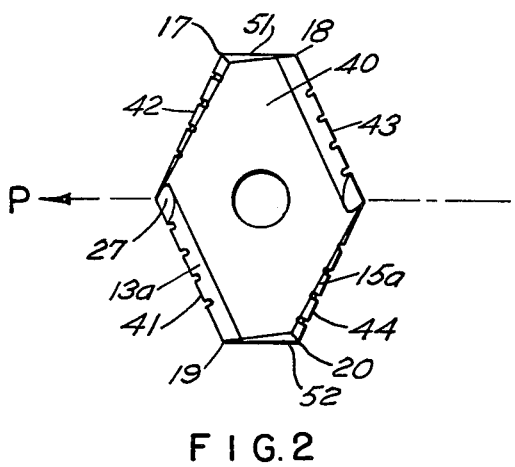
FIG. 2 is a top plan view of a spade drill blade made in accordance with the invention.
Figure 1:
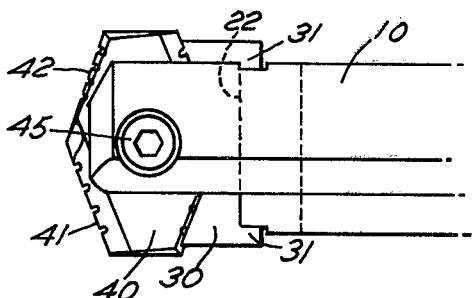
FIG. 1 is a partial plan view of a spade drill bit and holder of the type referred to in the instant invention.
Figure 6:
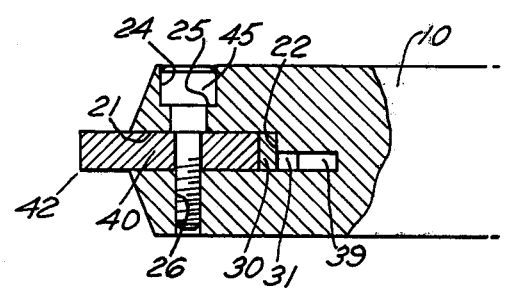
FIG. 6 is a side elevation view, partly in section, of the spade drill bit and holder.

Referring now to the drawings there is shown in FIGS. 1 and 6 a spade drill holder bar 10 which has at the end remote from the driving end a diametrical slot 21 (FIG. 6) cut therein. The bottom end of the slot defines a floor 22 and insert 30 is provided with a pair of protrusions 31 which is adapted to be placed against the floor 22 and protrusions rest on either side of the ends of the floor so that lateral movement thereof in the slit is prevented. A double bladed spade drill blade 40 as shown in FIG. 2 is provided for association in the slot or slit 21 and this blade is formed with two opposite sets of cutting edges 41, 42, 43 and 44 thereon. The clamping slit is provided with an extension slot 39 that extends from the bottom wall 22 to allow for greater bending moment between the legs and thus assure clamping of the drill bit blade within the slot. To retain the cutting blade in the slot 21, the head of clamp screw 45 in bore 24 bears against shelf 25 and threadingly engages bore 26 to draw the two legs together.

Figure 5:
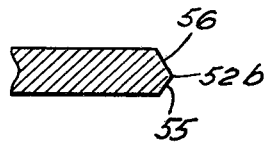
FIG. 5 is a sectional view taken on lines 5—5 of FIG. 3.
Figure 3:
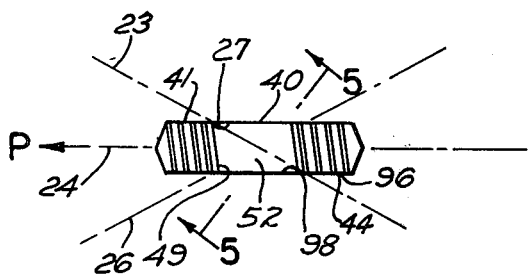
FIG. 3 is a side elevational view thereof.
Figure 5A:
FIGS. 5A, and 5B are further modified forms taken along the same sectional lines 5—5.
Figure 5B:

The spade drill blade 40 is especially suitable for use in tools shown in FIG. 1 and basically comprises a reversible bit for use in connection with the boring bar made in accordance with the disclosure in co-pending application Ser. No. 735,143 filed Oct. 26, 1976 of Holloway and Grunsky now U.S. Pat. No. 4,060,335. On one bit surface which, as shown in FIG. 2 faces to the left in the direction of the arrow P, there are two main cutting edge portions 41 and 42, while there is an opposite set of cutting edges 43 and 44. Each of these cutting edges are formed with top rake grooves which are illustrated as ground without any angle parallel to the upper surface of the blade and with a 12° top rake angle, for example, and with a relief surface as shown, for example, at 15a. Various rake angles may be used consistent with boring technology. Also as shown the blade may be provided with chip divider grooves if these are found desirable or necessary. The sides of the blade 51 and 52 are those portions which will guide the spade bit and which will engage the wall of the hole being drilled. These sides or lateral surfaces can take a variety of shapes as seen in FIG. 5 and are all characterized by having contact portions that engage the wall of the hole extending along a line 23 (see FIG. 3) which joins the corner points of the cutting edges which are designated 17, 18, 19 and 20. In like fashion the line 26 diagrammatically represents the side of the blade 40 and the contact points for this lateral surface with the wall of the bore which joins the corner points 17 and 18. Preferably lines 23 and 26 are between 27.5° to 47° to the plane of the blade 40. In the embodiment shown in FIG. 2 and FIG. 5A, the lateral edge 52 or side of the blade 40 is a curved surface 52a and if one were to extend the radius of curvature, it would intersect the rotational axis 24 of the spade drill blade and will, of course, extend along the line 23. In some cases it may be preferable to form the contact with two chamfered surfaces 55 and 56 as seen in FIG. 5 so that the line or edge 52b where these surfaces join will extend along the diagrammatic line 23 as seen in FIG. 3. Additionally, as seen in FIG. 5B, a compound type of surface providing a small cylindrical radius such as 52c may be provided which again will extend along the line 23 as seen in FIG. 3.

Figure 4:
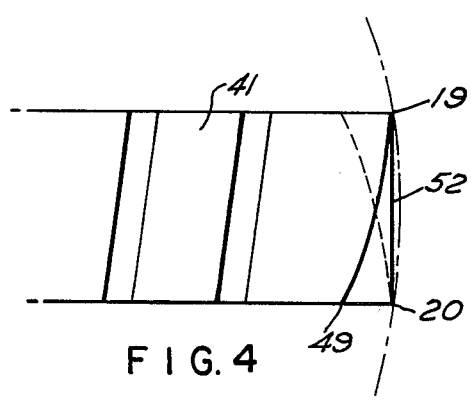
FIG. 4 is an enlarged partial front elevational view taken of FIG. 2 looking at the lateral side edge of the spade drill blade in a workpiece bore.

It should be noticed that the characterizing feature of this particular spade drill blade resides in the fact that there is virtually only a contact between the cutter blade 40 and the wall of the bore which contact extends along the lines denoted as 23 and 26 in FIG. 3. The angle of lines 23, 26 may extend on an angle to the plane of the cutter preferably less than 30° and ideally approximately 27.5°. As seen in FIG. 4, contact with the bore of the workpiece is only near the cutting edges 17, 18, 19 and 20. During drilling only a low friction will therefore exist between the lateral surfaces or sides of the blade 40 and the wall of the workpiece bore. In this way the risk of jamming or seizing or binding, shattering of the cutter blade in the workpiece bore, is virtually eliminated. Nevertheless, the spade drill blade, after it has drilled into the workpiece to the rear end 20 of its side surfaces, can now effectively bear along the diagonals 23, 26 against the workpiece bore, so that the risk of lateral deflection of the drill blade in the workpiece bore is also avoided. It will be understood that the outermost end points 17 and 20 are situated upon the radially outermost periphery of the blade so that the drilling diameter is determined by the drilling edges.

It will also be noted that the main cutting edge portions such as 41, 42, 43 and 44 which are illustrated in FIG. 2, will normally extend parallel to the plane of the blade. They may extend oblique to this plane so that their distance from the central plane of the cutter blade becomes less toward the middle of the cutter blade. The parallel orientation of the cutting edges, however, possesses the advantage in that the rake surfaces such as 13a likewise extend parallel to the plane of the blade and are more easy to grind. To provide a web thinning area at the point of the blade, a grind such as 27 may be formed into the rake surface.

It will be seen that what is provided here is something that is relatively easy to re-grind, since there are no unusual angles in connection with the rake surface and the blade therefor lends itself to re-grind and sharpening since nothing more than the original cutting edges need to be re-sharpened. From the foregoing it can be seen that the present invention provides a new form of a spade drill 40 having unique configuration of the outer edges 51 and 52 thereof in which essentially two point contact along a line is had with the workpiece bore eliminating such effects such as shattering and the like.

I claim:

1. A double edge spade drill blade comprising a block having parallel top and bottom plane faces, a first pointed cutting end formed on one edge of the block with a pair of cutting edges effected to drill a hole in the workpiece when the blade is rotated and fed axially against a workpiece, a second pointed cutting end located on an opposite edge of the block with a pair of cutting edges, said pointed ends located on and defining a rotational axis parallel to the plane faces, said blade having parallel side faces being formed to guide the blade into the drilled hole, said cutting edges extending from the pointed ends outwardly to the side faces, said side faces having a shape of raised form and narrow cross section to bear against the inner wall of the workpiece bore substantially adjacent said cutting edges in a lateral surface region which extends in a diagonal plane extending substantially through the central axis of rotation of the blade and intersecting the ends of the cutting edges at the side faces wherein said side faces bear against said workpiece bore at spaced points along said raised form at the intersection of said side faces and said ends of the cutting edges.

2. A spade drill blade as in claim 1 wherein said diagonal plane extends on an angle of approximately 27.5° to the plane faces.

3. A spade drill blade as in claim 1 wherein the side face surfaces of the blade are cylindrically rounded and the axis of curvature intersects the rotational axis of the drill blade.

4. A spade drill blade as in claim 1 wherein the side face surfaces of the blade are formed of intersecting surfaces, the line of intersection extending in a diagonal plane.

5. A spade drill blade as in claim 1 wherein the side face surfaces of the drill blade are formed with a small radius which extends in a plane.

* * * * *